INVENTOR.
Julius Clark
BY
Robert J. Patch
ATTY.

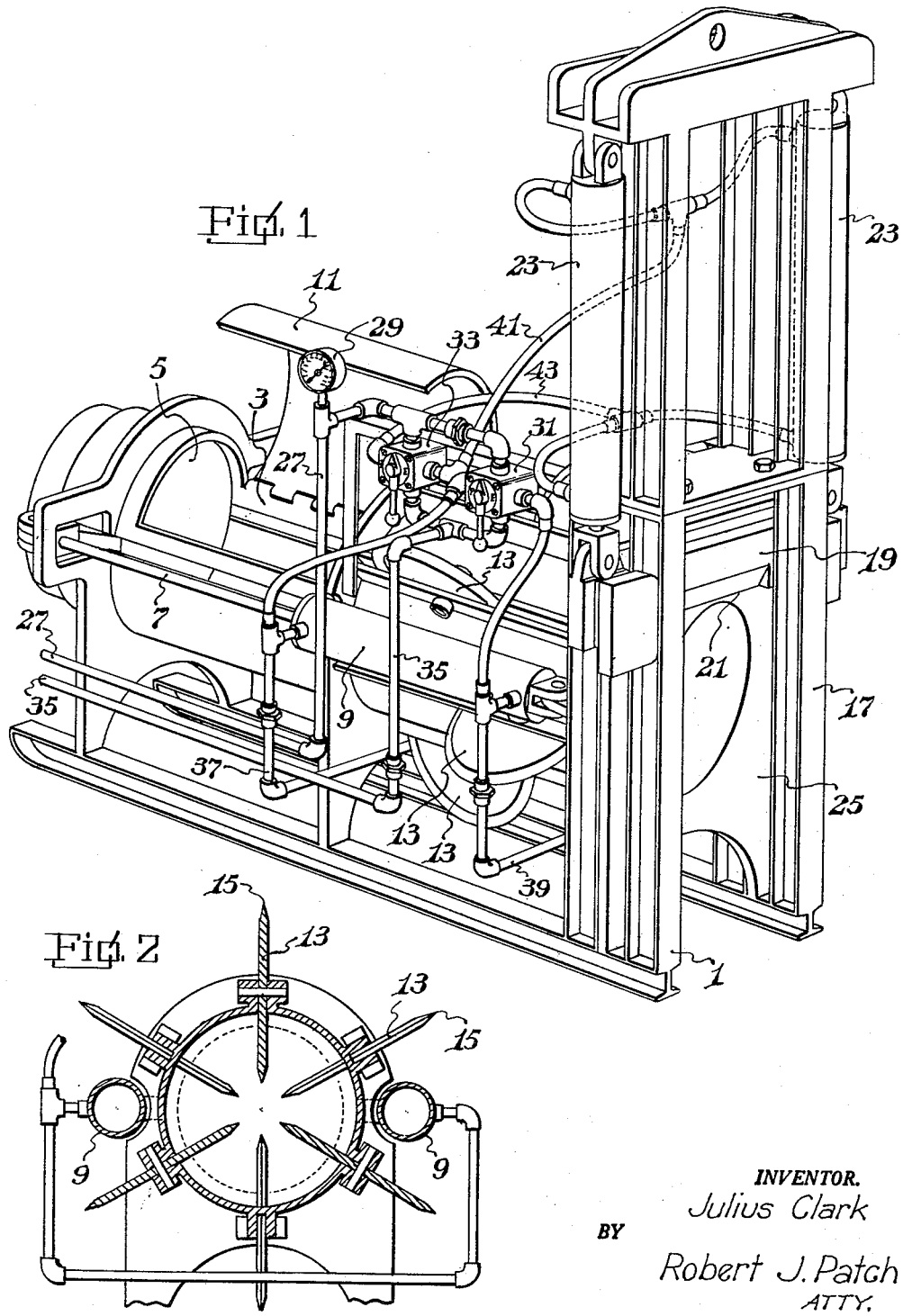

United States Patent Office 3,180,195
Patented Apr. 27, 1965

3,180,195
APPARATUS FOR REMOVING THERMOPLASTIC
MATERIAL FROM CONTAINERS
Julius Clark, 313 W. Boston St., Broken Arrow, Okla.
Filed Oct. 10, 1960, Ser. No. 61,440
1 Claim. (Cl. 83—408)

The present invention relates to methods and apparatus for removing thermoplastic material from containers.

The art of removing thermoplastic materials from containers, in which the thermoplastic material is shipped and stored in relatively hardened condition in the containers but must be removed from the containers and melted prior to use, it is a common practice to chop or cut the material from the container in a hardened condition and then put the relatively small pieces of material in a melting pot. The melted material, such as bituminaceous materials, may then be used for coating pipelines, roofing, road work, or other applications.

The operation of cutting the material out of the container is slow and laborious. For applications where a great deal of material is required or where the work site is continuously moving, such as in pipeline work where the pipeline coater moves relatively rapidly along the pipeline to be coated, the operation of chopping out small pieces of material for the melting kettle actually delays the coating operation. On the other hand, the material has to be broken up prior to melting, for otherwise it would melt too slowly.

Therefore, it is an object of the present invention to provide methods and apparatus for quickly and easily placing packaged thermoplastic materials in condition for rapid melting.

Another object of the present invention is the provision of apparatus and methods for quickly and easily melting packaged thermoplastic materials.

Finally, it is an object of the present invention to provide such methods that will be rapid and reliable to practice, and to provide such apparatus that will be relatively simple and inexpensive to manufacture, easy to operate, maintain and repair, and rugged and durable in use.

Other objects and advantages of the present invention will become apparent from a consideration of the following description, taken in connection with the accompanying drawings, in which:

FIGURE 1 is a perspective view of apparatus according to the present invention;

FIGURE 2 is an elevational view of the discharge end of apparatus according to the present invention;

Figure 3:
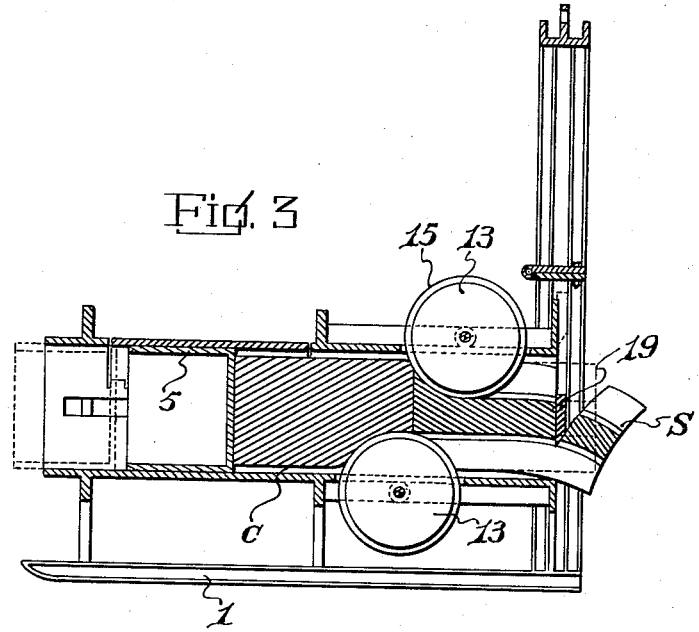
FIGURE 3 is a somewhat diagrammatic side view in longitudinal section showing apparatus according to the present invention at one stage of operation.
Figure 5:
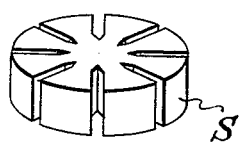
FIGURE 5 is a view of a cut-up piece produced by the present invention prior to melting.

Very broadly stated, the present invention comprises a method and apparatus characterized in that hardened thermoplastic material in a container is cut up, container and all, and then melted, the melt being separated from the cut-up pieces of container. In the particular form of cut-up piece of material provided by the preferred embodiment of the present invention, a number of cut-apart pieces of container cling to a single piece of cut-up thermoplastic material, so that the thermoplastic material may be easily handled after cutting but at the same time the number of pieces of container will be desirably large so as to consolidate the container as much as possible within the melt. The preferred form of apparatus is characterized by a plurality of rotary cutting discs disposed radially of the direction of movement of the container having the material therein, and by a knife blade having a guillotine action for separating individual pieces of cut-up material. The preferred form of container is cylindrical.

Referring now to the drawings in greater detail, there is shown a machine embodying a preferred form of the present invention and comprising a frame 1 on which is mounted a cylindrical chamber 3. Chamber 3 is open at its front end and is closed at its rear end by a reciprocable plunger 5. Plunger 5 is reciprocable on the horizontal axis of chamber 3 by means of a piston rod 7 disposed horizontally on each side of chamber 3 and attached at their rear ends to the plunger 5 and at their forward ends to pistons (not shown) operatively disposed in cylinders 9 for hydraulic actuation to the front or the rear.

Chamber 3 is provided adjacent its rear with a hinged partly cylindrical lid 11 to admit filled containers of thermoplastic material into chamber 3, and adjacent its forward end with a plurality of freely rotating cutter discs 13 mounted for rotation on non-parallel axes which are perpendicular to but spaced from the axis of chamber 3, so that cutter discs 13 are disposed in planes radial to the axis of chamber 3. Each cutter disc 13 has a peripheral circular cutting edge 15. Alternate cutter discs 13 are staggered to the front or rear axially of chamber 3 so that the cutter discs will not engage the material to be cut all at once. Although cutting edges 15 of discs 13 extend radially inward from their axes of rotation, they terminate short of the axis of chamber 3. Thus, discs 13 are spaced apart as best seen in FIGURE 2.

Figure 4:
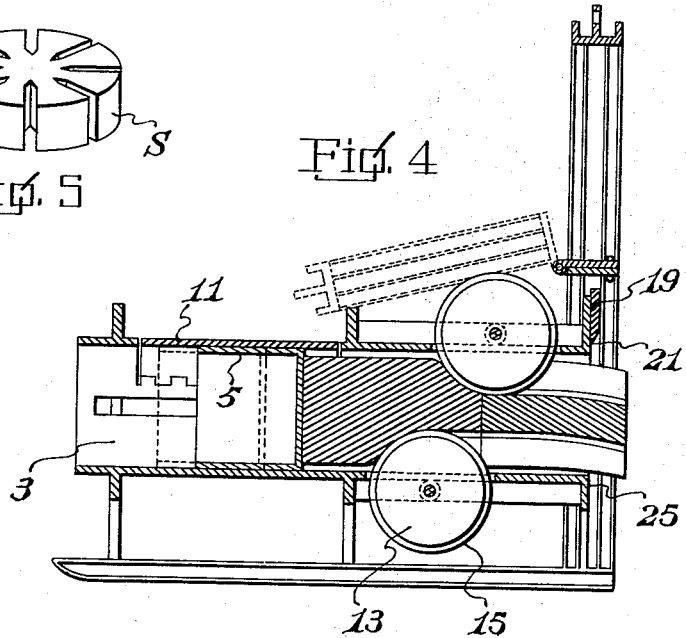
FIGURE 4 is a view similar to FIGURE 3 but showing apparatus according to the present invention at another stage of operation and with an alternative position of the parts shown in phantom line.

Still farther to the front of the machine is a subframe 17 which provides a guideway for a cutter blade 19 that moves transversely of the axis of chamber 3 and has a cutting edge 21 that passes entirely across the opened forward end of chamber 3. Cutter blade 19 is actuated by cylinder and piston assemblies 23. The opened forward end of chamber 3 is surrounded by a flat apertured plate 25 having its forward or outer surface disposed in the plane of movement of cutting edge 21 of cutter blade 19, so that cutting edge 21 has a scissors action with the outer surface of plate 25 about the opening of chamber 3 through plate 25, as best seen in FIGURES 3 and 4. Cylinder and piston assemblies 23 are mounted on an upper portion of subframe 17, and this upper portion may be swung downward when the equipment is not in use, as shown in phantom line in FIGURE 4. This downward folding movement reduces the overall height of the equipment for shipping or storage and is made possible by disconnecting the pistons of assemblies 23 from the ends of blade 19.

Cylinder and piston assemblies 7, 9 and 23 are hydraulically operated from a common source of fluid pressure (not shown). Fluid under pressure passes through a conduit 27 past a pressure gauge 29 to both of a pair of valves 31 and 33. From valves 31 and 33, exhaust fluid passes through a return conduit 35. Valve 31 is individual to cylinder and piston assemblies 7, 9 and selectively interconnects the pressure and return conduits 29 and 35 with the front or rear end of cylinder 9 through conduits 37 and 39 in the usual manner. Valve 33, in turn, is individual to cylinder and piston assembly 23 and selectively connects pressure or return conduits 27 or 35 with the upper or lower ends of the cylinder of cylinder and piston assembly 23 through conduits 41 and 43.

The method of practicing the invention and the operation of the apparatus according to the invention will now be apparent. Lid 11 is raised with plunger 5 fully retracted, and there is placed in the rear portion of chamber 3 a cylindrical container C having therein a mass of hardened thermoplastic material such as asphalt or pitch, or the like. Chamber 3 supports container C coaxially therein. Container C may be of steel or fiberboard or wood or the like. The material within container C is hardened in the sense that it will not flow readily as a liquid at room temperature and thus is not susceptible to discharge from container C merely by pouring at room temperature. On the other hand, it is not necessary that the material be a "solid" as distinguished from a "liquid," for in point of fact, many bituminaceous materials within the scope of the present invention are technically liquids at room temperature even though they may seem quite hard or even brittle.

Lid 11 is closed and valve 31 is manipulated to send pressure fluid to the rear of cylinders 9 thereby to draw piston rods 7 forward and with them plunger 5. Container C with its charge of hardened thermoplastic material is thus moved to the front where it contacts the rearmost of the cutter discs 13. These cutter discs penetrate both the container and its contents and form a number of radial cuts in the cylindrical mass, these radial cuts extending lengthwise of the cylinder but terminating short of the axis of the cylinder. Discs 13 turn with the cut material as it passes by, thereby to reduce the friction between the cut material and the discs and to reduce the total power requirements of the machine.

When a given container C has passed as far to the front as it can under the influence of plunger 5, the plunger is retracted and lid 11 opened again and a second container and contents is placed in the rear portion of chamber 3. Plunger 5 is again moved to the front, and the second container presses against the rear of the first container, moving the first container farther to the front through the machine. When the front end of the first container projects beyond the machine as shown in FIGURES 3 and 4, cutter blade 19 is forced down by manipulation of valve 33 so as to send pressure fluid to the upper ends of the cylinders of cylinder and piston assemblies 23. A slice S is thus cut off by passage of cutting edge 21 of blade 19 through container C as well as through the contents of the container by a scissors or guillotine action between cutting edge 21 and plate 25. The plunger 5 is advanced still farther and a fresh container C introduced into chamber 3 from time to time as required, so that cutter blade 19 may continuously cut off further slices S for the melting pot (not shown).

The slices cut from the containers are unique. Each is of a thickness to be readily melted in a melting pot, and each is partially traversed by a plurality of radially disposed grooves or slots. These grooves or slots not only expose a greater surface of the slice so as to render the slice more readily meltable in the pot, but also the slots or grooves mark the divisions between the pieces of container that cling to the outer periphery of the slice. Thus, a given slice that has, say, six radial grooves will also have six pieces of container attached to it in the as-cut condition. The fact that the number of pieces of container is greater than the number of slices of thermoplastic material is an important feature of the invention, for it assures that the thermoplastic material will be of a size that can be conveniently handled when introducing it into the melting pot, but at the same time it assures that the number of pieces into which the container is cut up will be desirably large and the size of the individual pieces will be desirably small, so that the container as it collects in the melting pot will be desirably compact. Moreover, the same grooves or slots that are formed in cutting apart the individual pieces of container are also quite useful in speeding up the melting of the slices. Thus, the same cutting operation that assures that the slices will be cut so as to melt the quickest also assures that the container will be cut up so as to occupy the least space in the melting pot, for it is obvious that if the containers were thrown into the melting pot without cutting or if they were cut only into circular hoops, the total space occupied by the containers would soon exceed the space occupied by the melted material and further material introduced into the pot would not fall into the melt. As it is, however, it is quite easy to separate the melt and the pieces of cut-up container simply by decanting the melt or by draining it or by other known methods, after which the cut-up containers can be discarded.

From a consideration of the foregoing disclosure, it will be obvious that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claim.

What is claimed is:

Apparatus for removing thermoplastic material from a cylindrical container, comprising a plurality of cutter discs rotatable about fixed axes, each said cutter disc being disposed at equal acute angles to its immediately adjacent cutter discs, the axes of alternate cutter discs being spaced from the axes of the remaining cutter discs in the direction of movement of the material, there being an even number of cutter discs so that there are two sets of cutter discs spaced apart in the direction of movement of the material and the discs of each set are spaced equal angles apart, pusher means for engaging behind and pushing a cylindrical container along its axis through the assembly of cutter discs, guide means for the cylindrical container ahead of and behind the cutter discs relative to the direction of movement of the cylindrical container through the assembly of cutter discs, the cutter discs extending radially inwardly beyond the guide means toward said axis but terminating short of said axis a distance substantially less than the distance by which the cutter discs extend inwardly beyond the guide means, and a knife movable perpendicular to the direction of movement of the material and entirely across the path of movement of the material thereby to cut the material into a plurality of cut apart pieces each having a plurality of radially disposed slits extending full length thereof.

References Cited by the Examiner

UNITED STATES PATENTS

| | | | |
|---|---|---|---|
| 820,692 | 5/06 | Aldous | 30—265 |
| 1,471,025 | 10/23 | Evaniuk | 30—273 |
| 1,771,496 | 7/30 | Lequillon | 83—407 |
| 1,825,629 | 9/31 | Floyd | 146—99 |
| 2,017,559 | 10/35 | Wolfinger | 146—169 |
| 2,044,214 | 6/36 | Jones | 210—69 |
| 2,045,856 | 6/36 | Hoyt et al. | 210—69 |
| 2,145,965 | 2/39 | Beatty | 83—437 X |
| 2,209,295 | 7/40 | Hjelte | 146—169 |
| 2,319,198 | 5/43 | Barrans | 83—408 |
| 2,344,003 | 3/44 | Sheptinsky | 83—407 |
| 2,731,085 | 1/56 | Broden | 83—431 X |

FOREIGN PATENTS

| | | |
|---|---|---|
| 723,102 | 7/42 | Germany. |
| 711,026 | 6/54 | Great Britain. |

ANDREW R. JUHASZ, *Primary Examiner.*
HERBERT L. MARTIN, CARL W. TOMLIN,
*Examiners.*